United States Patent [19]

Marsh

[11] 4,341,690

[45] Jul. 27, 1982

[54] STABILIZED POLYPROPYLENE COMPOSITION

[75] Inventor: Harold P. Marsh, Kingsport, Tenn.

[73] Assignee: Eastman Kodak Company, Rochester, N.Y.

[21] Appl. No.: 202,403

[22] Filed: Oct. 31, 1980

[51] Int. Cl.³ .............................................. C08L 67/00
[52] U.S. Cl. .................................... 524/451; 525/177; 524/513
[58] Field of Search ................ 260/40 R, 40 P, 42.45, 260/42.46, 42.21; 525/177

[56] References Cited

U.S. PATENT DOCUMENTS 3,223,752 12/1965 Tate et al. ............................ 525/177
3,516,957 6/1970 Gray, Jr. et al. ................ 260/40 R
3,874,880 4/1975 Venor et al. ...................... 260/42.46

OTHER PUBLICATIONS

"Condensed Chemical Dictionary", 7th Edition, (1966), p. 915, Reinhold Publishing Corporation, NY.

Primary Examiner—J. Ziegler
Attorney, Agent, or Firm—John F. Stevens; Daniel B. Reece, III

[57] ABSTRACT

Disclosed are plastic grade polypropylene compositions suitable for molding and extrusion, which contain an inert particulate filler material such as talc and a polyester which greatly increases the heat stability of articles produced therefrom. The polypropylene is semi-crystalline, isotactic, having a density equal to or greater than 0.90. The polyesters used in the composition of this invention are described as linear, saturated crystalline polyesters derived at least in part from terephthalic acid and 1,6-hexanediol.

6 Claims, No Drawings

STABILIZED POLYPROPYLENE COMPOSITION

TECHNICAL FIELD

This invention relates to compositions of plastic grade, semi-crystalline, polypropylene containing an inert filler material, and having improved heat stability.

BACKGROUND ART

In the past, it has been conventional practice to include in molding and extrusion grade polypropylene various additives which give heat stability to the polymer. Normally, about 0.5% by weight of the additives is used. The additives include antioxidants such as dilaurylthiodiporpionate, Irganox 1010 (tetrakis[methylene(3,5-di-tert-butyl-4-hydroxyhydrocinnamate)methane]), and Naugard PHR (tris-[mixed mono- and dinonylphenyl]phosphite), sometimes in a mixture. It has now been found that the quantity of such antioxidants may be reduced by 50% or more, by the incorporation into the polypropylene, of a small amount of a less expensive polyester.

DISCLOSURE OF THE INVENTION

The present invention provides a composition comprising polypropylene, about 10–60% by weight (preferably about 20–40%) based on the weight of polypropylene, of talc, and about 0.5–3.0% by weight (preferably about 1–2%) based on the weight of polypropylene of a copolyester derived from at least 50 mole percent terephthalic acid and at least 50 mole percent 1,6-hexanediol, the copolyester having a melting point of less than 150° C. and a heat of fusion of from about 0.1 to about 12 calories per gram.

According to the present invention, there is provided a plastic grade polypropylene composition suitable for molding and extrusion, which contains an inert particulate filler material such as talc and a polyester which greatly increases the heat stability of articles produced therefrom.

The polypropylene useful in the present invention may be described as semi-crystalline, isotactic, having a density equal to or greater than 0.90, preferably about 0.902 to 0.920, as measured on a conventional density gradient tube. The polypropylene may be further described as having a Flow Rate of about 0.1 to about 24.0, preferably about 0.5 to about 12, as measured at 230° C. using a weight of 2.16 kg in accordance with ASTM D-1238. Many such polypropylenes are commercially available.

The polyesters used in the compositions of this invention are described as linear saturated crystalline polyester of acid moieties and dihydric alcohol moieties. At least 40 mole percent of the acid moieties are terephthalic acid moieties. The polyester contains as moieties of the dihydric alcohol about 40–100 mole percent 1,6-hexanediol and 0 to about 60 mole percent 1,4-butanediol.

Polyesters described in U.S. Pat. No. 4,046,837 are suitable for use in the composition of this invention.

The copolyesters contain terephthalic acid moieties. These "terephthalic moieties" can be supplied by the usual terephthalic moiety sources, e.g., terephthalic acid, terephthalic chloride and the mono- and dialkyl esters of terephthalic acid. Thus, the term "terephthalic moiety" or "terephthalic acid moiety" is to be considered as including those moieties supplied by the acid chloride or a mono- or diester. The polyester contains terephthalic acid in an amount of at least 40 mole %, based upon the acid moieties. Stated differently, the copolyester of the invention is a terephthalic acid copolyester in which from 1 to 60 mol percent of the terephthalyl acid moieties are replaced, if desired by a second acid moiety.

If a portion of the terephthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, azelaic or sebacic acid or mixtures thereof. Alternatively, 1 to 60 mole % of the terephthalic acid content can be replaced by isophthalic acid. As a third alternative, a portion of the terephthalic acid content can be replaced by an isophthalic acid moiety or a moiety of one or more saturated aliphatic dicarboxylic acids.

The diol component of the copolyesters of the invention preferably comprises a mixture of 1,4-butanediol and 1,6-hexanediol where the combined quantities of these diols constitute all of the diol component.

With respect to the aliphatic or the named aromatic dicarboxylic acids polyester forming derivatives can be used in the preparation of the polyester, especially the mono- or dialkyl esters of the named dicarboxylic acids, especially $C_1$–$C_4$ mono- or dialkyl esters, particularly the dimethyl esters.

The preferred polyesters are further described as having a glass transition temperature (Tg) of about −10° C. to +30° C.; a melting point of about 40° C. to about 130° C., preferably between about 55° C. and about 115° C.; an inherent viscosity (I.V.) of about 0.5 to about 1.5, preferably about 0.7 to about 1.2; and a heat of fusion ($\Delta H_f$) of between about 0.1 and about 12 calories per gram.

The preparation of the partially crystalline copolyesters of the invention can be performed in a conventional manner. For example, the method of preparation can be similar to that of polyethylene terephthalate. There follows a description of a typical method for preparing the copolyester. Other techniques can be used where the terephthalic acid moiety is supplied by terephthalic acid itself rather than from an ester. In some cases, direct esterification can be employed. Those of skill in the polyester art well know the manipulative procedures whereby polyesters and copolyesters of terephthalic acid and dihydric alcohols can be employed. The manipulative procedure by which the copolyesters are prepared does not differ. Additionally, the relative amounts of these components determine the characteristics of the resultant polyester.

In an autoclave provided with a stirrer, for example, dimethylterephthalate and dimethylisophthalate can be esterified in a molar ratio of 90:10, for example, with a mixture of 1,4-butanediol and 1,6-hexanediol (in a molar ratio of 35:65 for example) in the presence of a transesterification catalyst such as tetra n-butyltitanate and, if desired, zinc acetate dihydrate. The acid component and diol component can be used in equimolar amounts; preferably, excess amounts of the diol component are used, e.g., a diol to acid moiety mol ratio of 1.1:1.6, preferably 1.2:1.4.

At an internal temperature of about 150°–200° C., the methanol is distilled out at normal pressure. After injecting triphenylphosphite with a small amount of diol, for the purpose of inhibiting the transesterification catalyst, the autoclave is evacuated and the internal temperature is raised to 270° C. After about an hour the pressure is reduced to less than one Torr, and after an additional 3 to 4 hours of stirring, the vacuum is broken by the introduction of nitrogen, and the contents of the autoclave are removed through the bottom valve and granulated.

The melting point of the copolyesters is given as the melting maximum of the differential-thermocalorimetry (DSC-1, Perkin-Elmer, heating rate 16° C./min).

The Tg of the polyesters useful in this invention is measured on a Differential Scanning Colorimeter, Perkin-Elmer, Model 2.

The inert filler material is preferably talc and may be present in amounts of about 10–60% by weight based on the weight of polypropylene. The copolyester may be present in amounts of about 0.5–3.0% by weight, based on the weight of the polypropylene.

The polypropylene, inert filler material and polyester may be melt compounded using conventional mixers (e.g., Banbury Mixer), followed by extrusion or rolling to transform the compound into pellets for molding or extrusion.

The following examples are submitted for a better understanding of the invention. In the examples, the polypropylene used has a density of about 0.904, and a Flow Rate of about 4. The polyester is derived from dimethyl terephthalate, 80 mole % 1,6-hexanediol and 20 mole % 1,4-butanediol. The polyester has a Tg of about 12° C., a melting point of about 125° C., an I.V. of about 0.72, and a $\Delta H_f$ of about 9 calories per gram.

|  | Ex. 1 (Control) | Ex. 2 (Control) | Ex. 3 | Ex. 4 |
|---|---|---|---|---|
| Polyester, % | 0 | 0 | 2 | 1 |
| Flow Rate, g/10 min. | 4.5 | 6.4 | 6.0 | 6.3 |
| Specific Gravity | 1.254 | 1.230 | 1.236 | 1.241 |
| Deflection Temperature, 264 psi °C. | 74 | 78 | 76 | 79 |
| Tensile Strength at Fracture, psi | 4400 | 4300 | 4000 | 4000 |
| Elongation at Fracture, % | 4 | 3 | 3 | 3 |
| Flexural Modulus of Elasticity, psi × $10^5$ | 5.40 | 5.00 | 4.60 | 4.65 |
| Notched Izod Impact Strength, at 23° C. ft-lbs./in. of notch | 0.5 | 0.4 | 0.5 | 0.5 |
| Unnotched Izod Impact Strength, at 23° C. ft-lbs./in. of width | 6.9 | 7.1 | 7.0 | 6.8 |
| Aver. Oven Life, hr. |  |  |  |  |
| 50 mil thick | 190 | 290 | 1445 | 1465 |
| 125 mil thick | 455 | 650 | 1825 | 1870 |
| Ash Content, % | 37.76 | 35.36 | 34.85 | 35.55 |
| Talc, % | 41.8 | 39.1 | 38.6 | 39.3 |

EXAMPLE 5

The oven life at 150° C. is checked for several 50 mil thick samples of polypropylene containing 40% talc and polyester. The polypropylene and polyester are as described for Examples 1–4. In one series of tests, the average oven life was increased from about 50 hours (containing no polyester) to about 350–600 hours containing 1% polyester and about 500–850 hours containing 2% polyester. In another series of tests, the average oven life is increased from about 275 hours to about 1400–1500 hours containing 1% polyester and about 1350–1500 hours containing 2% polyester. It is apparent that incorporating one or two percent of polyester in this formula very significantly increases the heat stability.

EXAMPLE 6

Standard tensile bars are hung in a 150° C. oven for various lengths of time until failure occurs. Their increased thickness (125 mil) caused an increased life. Groups of 11 bars are used with 5 for impact strength, 4 for flexural modulus and 2 for deflection temperature measurement. The bar lengths are also measured to determine shrinkage differences. All of the bars are found to shrink 1% in length after three days in the oven and remain constant thereafter. The effect of heating time on the impact strength, deflection temperature and flexural modulus indicate that the addition of the polyester does not significantly affect these properties.

EXAMPLE 7

Since the oven life times obtained on samples containing the polyester are so much longer than really required, the more useful approach might be to reduce the level of antioxidant used. Normally, polypropylene is made using a concentrate added at a level of about 0.5%. This concentrate contains dilaurylthiodipropionate, Irganox 1010, Naugard PHR and calcium stearate as a physical blend. A series of samples is prepared using a range of levels of this concentrate. It is quite evident that reducing the level of stabilization is feasible when polyester is included in the formula. Depending on the desired level of heat stability, the concentrate level can be reduced 50% or more of conventional usage providing a cost reduction.

Whenever the term "inherent viscosity" (I.V.) is used herein, it will be understood to refer to viscosity determinations made at 25° C. using 0.25 gram of polymer per 100 ml. of a solvent composed of 60 percent phenol and 40 percent tetrachloroethane.

For purposes herein, the term "melting point" (Tm) means that temperature at which the solid and liquid phases of the material are at equilibrium at atmospheric pressure.

The "heat of fusion" $\Delta H_f$ of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in Journal of Applied Polymer Science, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

ASTM procedures are used for measuring the tensile strength and elongation (ASTM D1708), flexural modulus (ASTM D790), Izod impact strength (ASTM D256 Method A), and heat-deflection temperature (ASTM D648).

Oven life is described as the number of hours a sample withstands a temperature of 150° C. until failure occurs.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

I claim:

1. Composition comprising polypropylene, about 10–60% by weight based on the weight of polypropylene, of talc, and about 0.5–3.0% by weight based on the weight of polypropylene of a copolyester derived from at least 50 mole percent terephthalic acid and at least 50 mole percent 1,6-hexanediol, said copolyester having a melting point of less than 150° C. and a heat of fusion of from about 0.1 to about 12 calories per gram.

2. Composition according to claim 1 wherein said polypropylene has a density of about 0.902 to about 0.920 and a Flow Rate of about 0.1 to about 24.0.

3. Composition according to claim 1 wherein said polypropylene has a density of about 0.902 to about 0.920 and a Flow Rate of about 0.5 to about 12.

4. Composition according to claim 1 wherein said copolyester is derived from terephthalic acid, 1,4-butanediol and 1,6-hexanediol.

5. Composition according to claim 1 wherein said copolyester has a glass transition temperature of about −10° C. to about +30° C., a melting point of about 40° C. to about 130° C., an inherent viscosity of about 0.5 to about 1.5 and a heat of fusion of about 0.1 to about 12 calories per gram.

6. Composition comprising polypropylene having a density of about 0.902 to about 0.920 and a Flow Rate of about 0.1 to about 24.0, about 10–60% by weight based on the weight of polypropylene of talc, and about 0.5 to about 3.0% by weight based on the weight of polypropylene of a copolyester derived essentially from terephthalic acid, 1,6-hexanediol and 1,4-butanediol, said polyester having a glass transition temperature of about −10° C. to about +30° C., a melting point of about 40° C. to about 130° C., an inherent viscosity of about 0.5 to about 1.5 and a heat of fusion of about 0.1 to about 12 calories per gram.

* * * * *